US012639569B2

(12) United States Patent
Mysore Jayaram et al.

(10) Patent No.: US 12,639,569 B2
(45) Date of Patent: May 26, 2026

(54) RESOURCE INFRASTRUCTURE PREDICTION USING MACHINE LEARNING

(71) Applicant: Dell Products L.P., Round Rock, TX (US)

(72) Inventors: Harish Mysore Jayaram, Cedar Park, TX (US); Bijan Kumar Mohanty, Austin, TX (US); Brent N. Davis, Phoenix, AZ (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 800 days.

(21) Appl. No.: 17/968,936

(22) Filed: Oct. 19, 2022

(65) Prior Publication Data

US 2024/0135161 A1 Apr. 25, 2024
US 2024/0232605 A9 Jul. 11, 2024

(51) Int. Cl.
*G06N 3/08* (2023.01)

(52) U.S. Cl.
CPC ...................................... *G06N 3/08* (2013.01)

(58) Field of Classification Search
CPC ...................................................... G06N 3/08
See application file for complete search history.

(56) References Cited

U.S. PATENT DOCUMENTS

| | | | |
|---|---|---|---|
| 2013/0174149 A1* | 7/2013 | Dasgupta | G06F 9/5077 718/1 |
| 2016/0078388 A1* | 3/2016 | Himmelreich | G06Q 10/063 709/224 |
| 2016/0380908 A1* | 12/2016 | Larsson | H04L 67/10 709/226 |
| 2019/0182980 A1* | 6/2019 | Jia | H05K 7/1492 |
| 2020/0171382 A1* | 6/2020 | Agoston | G06F 9/5027 |
| 2022/0138786 A1* | 5/2022 | Sawarkar | H04L 47/83 705/7.35 |
| 2023/0030795 A1* | 2/2023 | Govindarajan | G06F 9/5011 |

OTHER PUBLICATIONS

U.S. Appl. No. 17/861,553 filed in the name of Bijan Kumar Mohanty et al. Jul. 11, 2022, and entitled "Resource Prediction for Microservices."

* cited by examiner

*Primary Examiner* — Mark D Featherstone
(74) *Attorney, Agent, or Firm* — Ryan, Mason & Lewis, LLP

(57) ABSTRACT

A method comprises receiving a request to predict a type and a quantity of respective ones of a plurality of resources for a computing environment. Using a multiple output classification and regression machine learning model, the type and the quantity of the respective ones of the plurality of resources are predicted in response to the request. The machine learning model is trained with a dataset comprising historical resource data corresponding to respective ones of a plurality of users.

20 Claims, 13 Drawing Sheets

1300

1302 ⟶ RECEIVE A REQUEST TO PREDICT A TYPE AND A QUANTITY OF RESPECTIVE ONES OF A PLURALITY OF RESOURCES FOR A COMPUTING ENVIRONMENT

1304 ⟶ PREDICT, USING A MULTIPLE OUTPUT CLASSIFICATION AND REGRESSION MACHINE LEARNING MODEL, THE TYPE AND THE QUANTITY OF THE RESPECTIVE ONES OF THE PLURALITY OF RESOURCES IN RESPONSE TO THE REQUEST, WHEREIN THE MACHINE LEARNING MODEL IS TRAINED WITH A DATASET COMPRISING HISTORICAL RESOURCE DATA CORRESPONDING TO RESPECTIVE ONES OF A PLURALITY OF USERS

400

| CUST. | INSTANCE TYPE | COMPUTE QUANTITY | COMPUTE SIZE (MILLI-CPU) | EPHEMERAL STORAGE SIZE (MiB) | AVG. CPU UTILIZATION (%) | AVG. MEMORY UTILIZATION (%) | AVG. STORAGE UTILIZATION (%) | AVG. N/W IO (KiB) | AVG. BLOCK IO (MiB) | TYPE OF SERVER | # OF SERVERS | TYPE OF STORAGE SYSTEM | # OF STORAGE SYSTEMS | TYPE OF N/W SYS. | # OF N/W SYS. |
|---|---|---|---|---|---|---|---|---|---|---|---|---|---|---|---|
| ABC | CONT. | 78 | 1000 | 512 | 27 | 62 | 56 | 1.63 | 0.36 | POWER EDGE RACK | 6 | POWER MAX | 3 | CISCO | 4 |
| XYZ | VM | 9 | 2000 | 1024 | 38 | 83 | 67 | 1.59 | 0.41 | VXRAIL | 3 | UNITY | 2 | CISCO | 3 |
| DEF | MIXED | 56 | 1000 | 512 | 43 | 54 | 55 | 0.79 | 0.27 | POWER EDGE TOWER | 5 | POWER VAULT | 3 | DELL | 4 |
| JKL | CONT. | 92 | 1000 | 512 | 62 | 65 | 72 | 0.53 | 0.19 | POWER EDGE RACK | 8 | POWER MAX | 4 | DELL | 3 |
| PQR | VM | 12 | 2000 | 1024 | 42 | 78 | 79 | 1.27 | 0.57 | VXRAIL | 4 | VMAX | 2 | DELL | 4 |

```
%matplotlib inline
import pandas as pd
import numpy as np
import matplotlib.pyplot as plt
import seaborn as sns
from sklearn.model_selection import train_test_split
from sklearn.metrics import mean_squared_error from sklearn.multioutput import MultiOutputRegressor
```

```
# reading the historical data file into pandas dataframe
infra_df = pd.read_csv('infrastructure_host_resource_metrics.csv')   # Read the historical host resource metrics of infrastru
```

```
# Encode the categorical values by using Label Encoding
from sklearn.preprocessing import LabelEncoder infra_df['customer'] = LabelEncoder().fit_transform(infra_df['customer'])
infra_df['usage_type'] = LabelEncoder().fit_transform(infra_df['usage_type'])
infra_df['instance_type'] = LabelEncoder().fit_transform(infra_df['instance_type'])
infra_df['server_type'] = LabelEncoder().fit_transform(infra_df['server_type'])
infra_df['storage_type'] = LabelEncoder().fit_transform(infra_df['storage_type'])
infra_df['network_type'] = LabelEncoder().fit_transform(infra_df['network_type'])

infra_df.head()
```

| | customer | instance_type | usage_type | compute_size | compute_qty | memory_size | compute_utilized | memory_utilized | storage_utilized | network_io |
|---|---|---|---|---|---|---|---|---|---|---|
| 0 | 2 | 2 | 2 | 78 | 1000 | 512 | 27 | 62 | 66 | 1.63 |
| 1 | 1 | 1 | 1 | 9 | 2000 | 1024 | 38 | 83 | 87 | 1.59 |
| 2 | 0 | 0 | 0 | 66 | 1000 | 512 | 43 | 54 | 66 | 0.79 |
| 3 | 4 | 2 | 3 | 92 | 1000 | 512 | 60 | 86 | 72 | 0.63 |
| 4 | 3 | 1 | 1 | 42 | 2000 | 1024 | 42 | 78 | 79 | 1.27 |

```
# Split train and test data sets
#first get the independent variables and dependent variable separated
features = [col for col in infra_df.columns if col is 'server_type' and col is 'server_qty' and
           col is 'storage_type' and col is 'storage_qty' and col is 'network_type' and col is 'network_qty']

x_train, x_test, y_train, y_test = train_test_split(infra_df[features], infra_df[['server_type',
                                                                                  'server_qty',
                                                                                  'storage_type',
                                                                                  'storage_qty',
                                                                                  'network_type', 'network_qty']],
                                                    test_size= .3, random_state=0)
```

```
Using tensorflow keras to create the dense neural network model for multi-output regression import tensorflow.keras as keras
from tensorflow.keras.layers import Dense input_layer = keras.Input(shape=1, name='input_layer')

dense_1 = keras.layers.Dense(1, name = 'dense_1')(input_layer)
dense_2 = keras.layers.Dense(1, name = 'dense_2')(dense_1)
dense_3 = keras.layers.Dense(1, name = 'dense_3')(dense_2)
dense_4 = keras.layers.Dense(1, name = 'dense_4')(dense_3)
dense_5 = keras.layers.Dense(1, name = 'dense_5')(dense_4)
dense_6 = keras.layers.Dense(1, name = 'dense_6')(dense_5)

classification_compute = keras.layers.Dense(0, activation = 'softmax', name = 'classification_compute')(dense_1)
regression_compute = keras.layers.Dense(1, activation = 'linear', name = 'regression_compute')(dense_2)
classification_storage = keras.layers.Dense(0, activation = 'softmax', name = 'classification_storage')(dense_3)
regression_storage = keras.layers.Dense(1, activation = 'linear', name = 'regression_storage')(dense_4)
classification_network = keras.layers.Dense(0, activation = 'softmax', name = 'classification_network')(dense_5)
regression_network = keras.layers.Dense(1, activation = 'linear', name = 'regression_network')(dense_6)

model = keras.Model(inputs=input_layer, outputs=[classification_compute, regression_compute,
                        classification_storage, regression_storage,
                        classification_network, regression_network])
```

```
model.compile(
optimizer="adam",
loss=[
    keras.losses.CategoricalCrossentropy(),
    keras.losses.MeanSquaredError(),
    keras.losses.CategoricalCrossentropy(),
    keras.losses.MeanSquaredError(),
    keras.losses.CategoricalCrossentropy(),
    keras.losses.MeanSquaredError(),
]
)

model.fit(X_train,
{"classification_compute": y_train['server_type'], "regression_compute": y_train['server_qty'],
"classification_storage": y_train['storage_type'], "regression_storage": y_train['storage_qty'],
"classification_network": y_train['network_type'], "regression_network": y_train['network_qty']},
epochs=200,
batch_size=50,
    verbose=1)
```

```
# Evaluate the loss value of the model using test data
results = model.evaluate(X_test, y_test, verbose=False)
print(results)
```

```
row = [4, 2, 2, 92, 1080, 512, 62, 65, 72, 0.53, 0.19, 0, 8, 0, 4, 1, 3]
predictions = model.predict([row])
```

FIG. 12

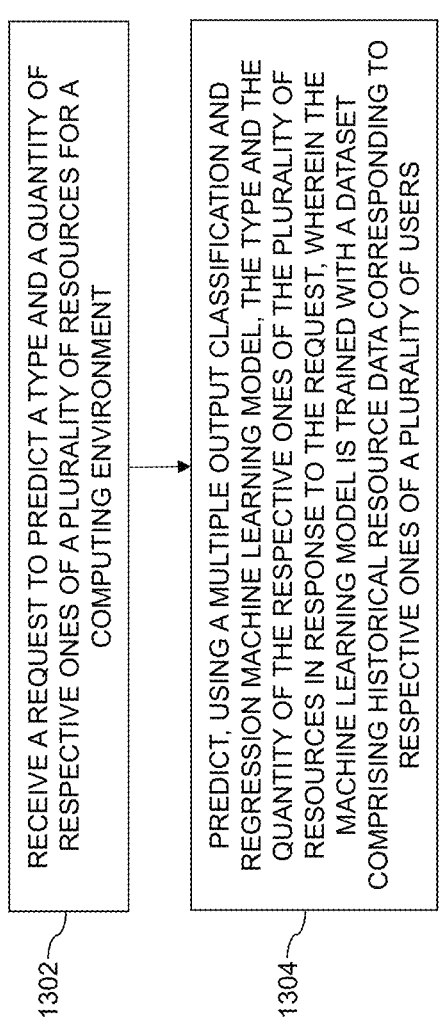

1300

1302 — RECEIVE A REQUEST TO PREDICT A TYPE AND A QUANTITY OF RESPECTIVE ONES OF A PLURALITY OF RESOURCES FOR A COMPUTING ENVIRONMENT

1304 — PREDICT, USING A MULTIPLE OUTPUT CLASSIFICATION AND REGRESSION MACHINE LEARNING MODEL, THE TYPE AND THE QUANTITY OF THE RESPECTIVE ONES OF THE PLURALITY OF RESOURCES IN RESPONSE TO THE REQUEST, WHEREIN THE MACHINE LEARNING MODEL IS TRAINED WITH A DATASET COMPRISING HISTORICAL RESOURCE DATA CORRESPONDING TO RESPECTIVE ONES OF A PLURALITY OF USERS

FIG. 13

RESOURCE INFRASTRUCTURE PREDICTION USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to management of resources in computing environments.

BACKGROUND

Many enterprises are utilizing heterogenous computing environments including public clouds from various providers and a private cloud presence in their own datacenters. Scalable private clouds may deploy, for example, servers, storage systems and network systems to provision compute, storage and network resources. Current approaches for the design of a private cloud environment to meet customer needs are inefficient and fail to address the variations between customers and how these differences affect computational requirements.

SUMMARY

Embodiments provide a resource prediction platform in an information processing system.

For example, in one embodiment, a method comprises receiving a request to predict a type and a quantity of respective ones of a plurality of resources for a computing environment. Using a multiple output classification and regression machine learning model, the type and the quantity of the respective ones of the plurality of resources are predicted in response to the request. The machine learning model is trained with a dataset comprising historical resource data corresponding to respective ones of a plurality of users.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 depicts example training data in an illustrative embodiment.

FIG. 5 depicts example pseudocode for importation of libraries in an illustrative embodiment.

FIG. 6 depicts example pseudocode for loading historical infrastructure and utilization data into a data frame in an illustrative embodiment.

FIG. 7A depicts example pseudocode for encoding training data in an illustrative embodiment.

FIG. 7B depicts encoded training data in an illustrative embodiment.

FIG. 8 depicts example pseudocode for splitting a dataset into training and testing components and for creating separate datasets for independent and dependent variables in an illustrative embodiment.

FIG. 9 depicts example pseudocode for building a neural network in an illustrative embodiment.

FIG. 10 depicts example pseudocode for compiling and training the neural network in an illustrative embodiment.

FIG. 11 depicts example pseudocode for computing error of a neural network model in an illustrative embodiment.

FIG. 12 depicts example pseudocode for predicting target values using the neural network in an illustrative embodiment.

FIG. 13 depicts a process for resource infrastructure prediction according to an illustrative embodiment.

DETAILED DESCRIPTION

Figure 1:
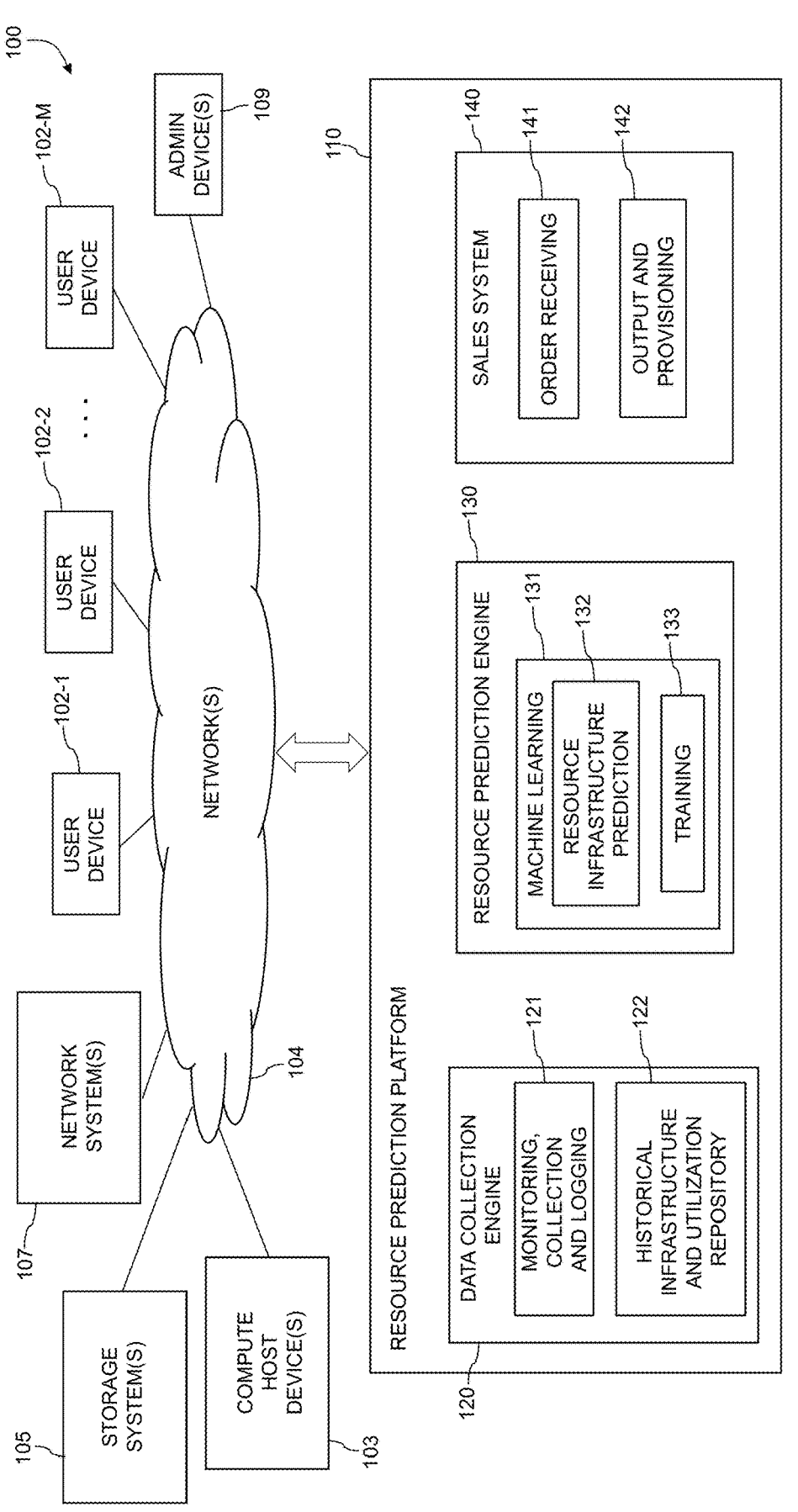
FIG. 1 depicts an information processing system with a resource prediction platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "resource" or "resources" refer to, for example, servers and associated virtual instances (e.g., virtual machines (VMs), containers and pods), storage systems and associated storage devices and network systems and associated network devices that may be part of a computing environment such as, for example, a private cloud environment.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises user devices 102-1, 102-2, . . . 102-M (collectively "user devices 102"), one or more compute host devices 103, one or more storage systems 105, one or more network systems 107 and one or more administrator devices ("Admin device(s)") 109. The user devices 102, compute host devices 103, storage systems 105, network systems 107 and administrator devices 109 communicate over a network 104 with a resource prediction platform 110. As explained in more detail herein, the one or more compute host devices 103, one or more storage systems 105, one or more network systems 107 are part of one or more computing environments such as, for example, a private cloud environment. The variable M and other similar index variables herein such as K and L are assumed to be arbitrary positive integers greater than or equal to one.

The user devices 102, compute host devices 103, storage systems 105, network systems 107 and administrator devices 109 can comprise, for example, Internet of Things (IoT) devices, desktop, laptop or tablet computers, mobile telephones, or other types of processing devices capable of communicating with the resource prediction platform 110 over the network 104. Such devices are examples of what are more generally referred to herein as "processing devices." Some of these processing devices are also generally referred to herein as "computers." The user devices 102, compute host devices 103, storage systems 105, network systems 107 and administrator devices 109 may also or alternately comprise virtualized computing resources, such as virtual machines (VMs), containers, pods, etc. The user devices 102, compute host devices 103, storage systems 105, network systems 107 and administrator devices 109 in some embodiments comprise respective computers associated with a particular company, organization or other enterprise.

The compute host devices 103, in some embodiments, comprise one or more virtual instances configured to execute designated services of an application. In some cases, microservices may run in the virtual instances to perform deployable services of an application. The microservices are loosely integrated into an application using API gateways. The virtual instances comprise, for example, a container (e.g., Docker, Linux container (LXC) or other type of container), virtual machine (VM) and/or pod on a host device (e.g., compute host device 103). As used herein, a "pod" refers to a group of one or more containers. The containers in a pod may share storage resources and a specification for how to run the containers.

In connection with, for example, the storage systems 105, the term "storage system" as used herein is intended to be broadly construed, and should not be viewed as being limited to content addressable storage systems or flash-based storage systems. A given storage system 105 as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system 105 in an illustrative embodiment.

A given storage system may comprise one or more storage arrays including respective sets of storage devices coupled to respective storage controllers. The storage devices of a storage array may implement logical units identified by logical unit numbers (LUNs) and configured to store objects associated with one or more devices (e.g., compute host devices 103). These objects can comprise files, blocks or other types of objects. Devices (e.g., compute host devices 103) interact with a storage array utilizing read and write commands as well as other types of commands that are transmitted over the network 104. Such commands in some embodiments more particularly comprise Small Computer System Interface (SCSI) commands, although other types of commands can be used in other embodiments. A given input-output (IO) operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage system 105 to include different portions of one or more physical storage devices. Storage devices may therefore be viewed as comprising respective LUNs or other logical storage volumes.

The network systems 107 comprise necessary hardware and software for interfacing with and connecting with devices and networks, and maintaining network connections between devices. The network systems 107 are connected to network 104 and may further comprise other networks within the network systems 107. The hardware includes physical equipment connected to a network (e.g., network 104). The physical equipment comprises, for example, computers, routers, network interface cards, IO cards, adapters, gateways, bridges, etc. The software includes, for example, programs and device drivers. Adapters or other devices can provide paths or interfaces between software of a network system 107 and a network (e.g., network 104).

The terms "user," "customer" or "administrator" herein are intended to be broadly construed so as to encompass numerous arrangements of human, hardware, software or firmware entities, as well as combinations of such entities. Resource prediction services may be provided for users utilizing one or more machine learning models, although it is to be appreciated that other types of infrastructure arrangements could be used. At least a portion of the available services and functionalities provided by the resource prediction platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the resource prediction platform 110, as well as to support communication between the resource prediction platform 110 and connected devices and systems (e.g., user devices 102, compute host devices 103, storage systems 105, network systems 107 and administrator devices 109) and/or other related systems and devices not explicitly shown.

In some embodiments, the administrator devices 109 are assumed to be associated with repair technicians, system administrators, information technology (IT) managers, software developers, release management personnel or other authorized personnel configured to access and utilize the resource prediction platform 110.

As noted above, current approaches for the design of a private cloud environment to meet customer needs are inefficient and fail to address how differences between customers affect computational requirements. For example, computation of the necessary infrastructure to build an environment to match the current and future resource needs of a customer is complex. Conventional approaches often underestimate or overestimate resource need, which leads to overuse of and stress on provisioned resources or wasteful provisioning of resources that are not needed. In the case of overuse of provisioned resources, resource performance may be degraded and result in failure of necessary tasks or of corresponding devices.

Infrastructure utilization and future growth can depend on a variety of factors including, but not necessarily limited to, type of usage (e.g., production (deployment), non-production (development) or a combination thereof), industry affiliations (e.g., finance industry, manufacturing industry, retail industry, health industry, etc.), and seasonal volume (increased seasonal load during holidays or other understood higher volume time periods). The current approaches, which utilize static, heuristic based computations, fail to take into account dynamic factors when allocating resources. Moreover, current approaches fail to adequately address the variety of resource types and how different resource types may be applied to different customer needs.

The illustrative embodiments advantageously leverage a multiple output classification and regression machine learning algorithm to predict infrastructures for various types of resources including, but not necessarily limited to, servers, storage systems and network systems. The multiple outputs (also referred to herein as "targets") comprise, for example, resource type and resource quantity for various resources that will be part of a computing environment. The machine learning model is trained with, for example, historical resource infrastructure and utilization data from multiple customers. The trained model analyzes multiple incoming factors for a given customer to predict optimal resource configurations for the given customer based, at least in part, on the historical resource infrastructure and utilization data.

The resource prediction platform 110 in the present embodiment is assumed to be accessible to the user devices 102, compute host devices 103, storage systems 105, network systems 107 and/or administrator devices 109 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the resource prediction platform 110 includes a data collection engine 120, a resource prediction engine 130 and a sales system 140. The data collection engine 120 includes a monitoring, collection and logging layer 121 and a historical infrastructure and utilization repository 122. The resource prediction engine 130 includes a machine learning layer 131 comprising resource infrastructure prediction and training layers 132 and 133. The sales system 140 includes an order receiving layer 141 and an output and provisioning layer 142.

In order to build and update the historical infrastructure and utilization repository 122, the monitoring, collection and logging layer 121 of the data collection engine 120 extracts and collects parameters corresponding to resource infrastructure and resource utilization of various components of existing or previously deployed computing environments (e.g., existing or previously deployed private cloud environments). The parameters may be collected from the compute host devices 103, storage systems 105 and network systems 107 and/or from applications used for monitoring component metrics. The parameters comprise, for example, virtual instance types (e.g., VM, container, pod, etc.), virtual instance identifiers (e.g., VM ID, container ID, pod ID, etc.), compute quantity, compute size (e.g., number of CPU cores (millicores)), memory size (e.g., size of RAM), storage size (e.g., ephemeral storage size), time period (e.g., one or more timestamps identifying when (e.g., date, time) certain parameters were collected, CPU utilization, memory utilization, storage utilization, network input-output (e.g., average network IO amounts), block input-output (e.g., average block IO amounts), server type, server quantity (number of each server type), storage system type, storage system quantity, network system type and network system quantity. The server, storage system and network system types, if, for example, associated with particular enterprise, may specify the product name/enterprise name for the server, storage system or network system and/or one or more specifications of the server, storage system or network system. The server, storage system and network system quantities specify, for example, the numbers of each server, storage system or network system type. Other collected parameters can include, for example, throughput, IO operations per second (IOPS), latency and/or user/customer information associated with particular resources or groups of resources.

As explained in more detail herein, the historical infrastructure and utilization data stored in the historical infrastructure and utilization repository 122 is input to the resource prediction engine 130 to be used as training data by the training layer 133. The historical parameters are used to train the machine learning model(s) used by the resource infrastructure prediction layer 132 to learn the resource infrastructure details for respective customers/entities and their corresponding usage areas (e.g., production (deployment), non-production (development) or a combination thereof), industry affiliations (e.g., finance industry, manufacturing industry, retail industry, health industry, etc.), and seasonal volume details.

In addition to building and updating the historical infrastructure and utilization repository 122, the monitoring, collection and logging layer 121 of the data collection engine 120 extracts and collects parameters corresponding to resource infrastructure and resource utilization of various components of existing computing environments (e.g., existing private cloud environments) in order to evaluate whether infrastructures are performing in accordance with designated standards or thresholds. If data such as, for example, CPU utilization, memory utilization, storage utilization, network IO, block IO, throughput, IOPS and latency are not within designated standards or thresholds, an alert for possible redesign a given computing environment may be generated and sent to the sales system 140 and/or one or more administrator devices 109.

The resource prediction engine 130, more particularly, the training layer 133 of the machine learning layer 131 uses the historical parameters collected by the monitoring, collection and logging layer 121 to train one or more machine learning models used by the resource infrastructure prediction layer 132 to predict resource infrastructures for computing environments that are to be formed.

In accordance with one or more embodiments, an order receiving layer 141 of the sales system 140 receives orders for new computing environments. In response to a received order, the sales system 140 generates a request for the resource prediction engine 130 to predict a type and a quantity of respective ones of a plurality of resources for the new computing environment. The request comprises a plurality of factors which are inputted to and analyzed by the resource infrastructure prediction layer 132 of the machine learning layer 131 in connection with the predicting. In an illustrative embodiment, the plurality of factors comprise, for example, an identification of needed resources (e.g., servers, storage systems and/or network systems) from the order, a type of usage (e.g., production (deployment) and/or non-production (development)) for the needed resources identified in the order, an industry corresponding to a requesting entity and/or volume of IO operations associated with one or more time periods (e.g., seasonal volume).

In illustrative embodiments, the resource infrastructure prediction layer 132 uses a multiple output classification and regression machine learning model to predict the type and the quantity of respective ones of the resources (e.g., servers, storage systems and/or network systems) in response to the request. The outputted server, storage system and network system types specify the product names for the servers, storage systems and/or network systems and/or one or more specifications of the servers, storage systems and/or network systems. The server, storage system and network system quantities specify, for example, the numbers of each server, storage system and/or network system type. The output and provisioning layer 142 of the sales system 140 generates an order for the resources in accordance with the prediction, and transmits the order to one or more user devices 102 to automatically provision the resources to the new computing environment.

The multi-output classification and regression machine learning model uses one or more independent variables (e.g., inputted factors) to predict multiple dependent variable outputs (e.g., type and quantity of different resources). The outputs are dependent on the input(s) and may be dependent on each other. For example, memory utilization may be dependent upon the CPU utilization and vice versa. In another example, resource quantity may be dependent on resource type and vice versa. The outputs are not necessarily independent of each other and may require a model that predicts outputs together or each output contingent upon other outputs.

In illustrative embodiments, the multi-output classification and regression machine learning model is a single model that predicts resource type and quantity for multiple resources (e.g., server, storage system and network system). The model predicts two different items, a resource type (classifier) and the quantity of each resource type (regressor). For example, the single model will predict compute resource type and quantity (e.g., server type and quantity), storage resource type and quantity (e.g., storage system type and quantity) and network resource type and quantity (e.g., network system type and quantity).

Illustrative embodiments may use different approaches and algorithms to achieve multi-target regression and classification. Some algorithms have built-in support for multiple outputs. In some embodiments, algorithms that do not have built-in support for multi-target regression and classification use a wrapper to achieve multi-output support. The embodiments utilize, for example, linear regression, k-nearest neighbor (KNN) regression and/or random forest regression algorithms, which natively support multi-target predictions. Some embodiments utilize, for example, support vector machine (SVM) regression or gradient boosting regression algorithms that do not natively support multi-target predictions. In this case, these algorithms are used in conjunction with a wrapper function (e.g., MultiOutputRegressor/MultiOutputRegressor), available from a multi-output package of an ScikitLearn library). Instances of the unsupported algorithms are input to the wrapper function to create a model that is capable of predicting multiple output values.

As noted herein, historical infrastructure and utilization data is used for training the multi-target classification and regression models. FIG. 4 depicts example training data in an illustrative embodiment. As can be seen in the table 400, the training data identifies user/customer information, and the following data associated with each user/customer ("Cust."): virtual instance types ("Instance Type") (e.g., VM, container (Cont.), Mixed (combination of different virtual instances)), compute quantity, compute size (e.g., number of CPU cores (millicores)), storage size (e.g., ephemeral storage size (MiB)), average CPU utilization (Avg. CPU utilization (%)), average memory utilization (Avg. memory utilization (%)), average storage utilization (Avg. storage utilization (%)), average network input-output (e.g., Avg. network IO (KiB)) and average block input-output (e.g., Avg. block IO (MiB)). Compute quantity indicates how many compute engines (including VMs, containers, mixed) a user/customer has. For example, if a user/customer has 9 VMs, the value of compute quantity will be 9 and the instance type will be VM.

The training data further includes six possible ones of the multiple outputs including, but not necessarily limited to, server type, server quantity (number of each server type), storage system type, storage system quantity, network system type and network system quantity. As shown in the table 400, the server, storage system and network system types can be associated with a particular enterprise, and may specify the product name/enterprise name for the server, storage system or network system and/or one or more specifications of the server, storage system or network system. The server, storage system and network system quantities specify, for example, the numbers of each server, storage system or network system type. The data shown in the table 400 is a non-limiting example of the attributes of training data, and the embodiments are not necessarily limited to the depicted attributes.

Figure 2:
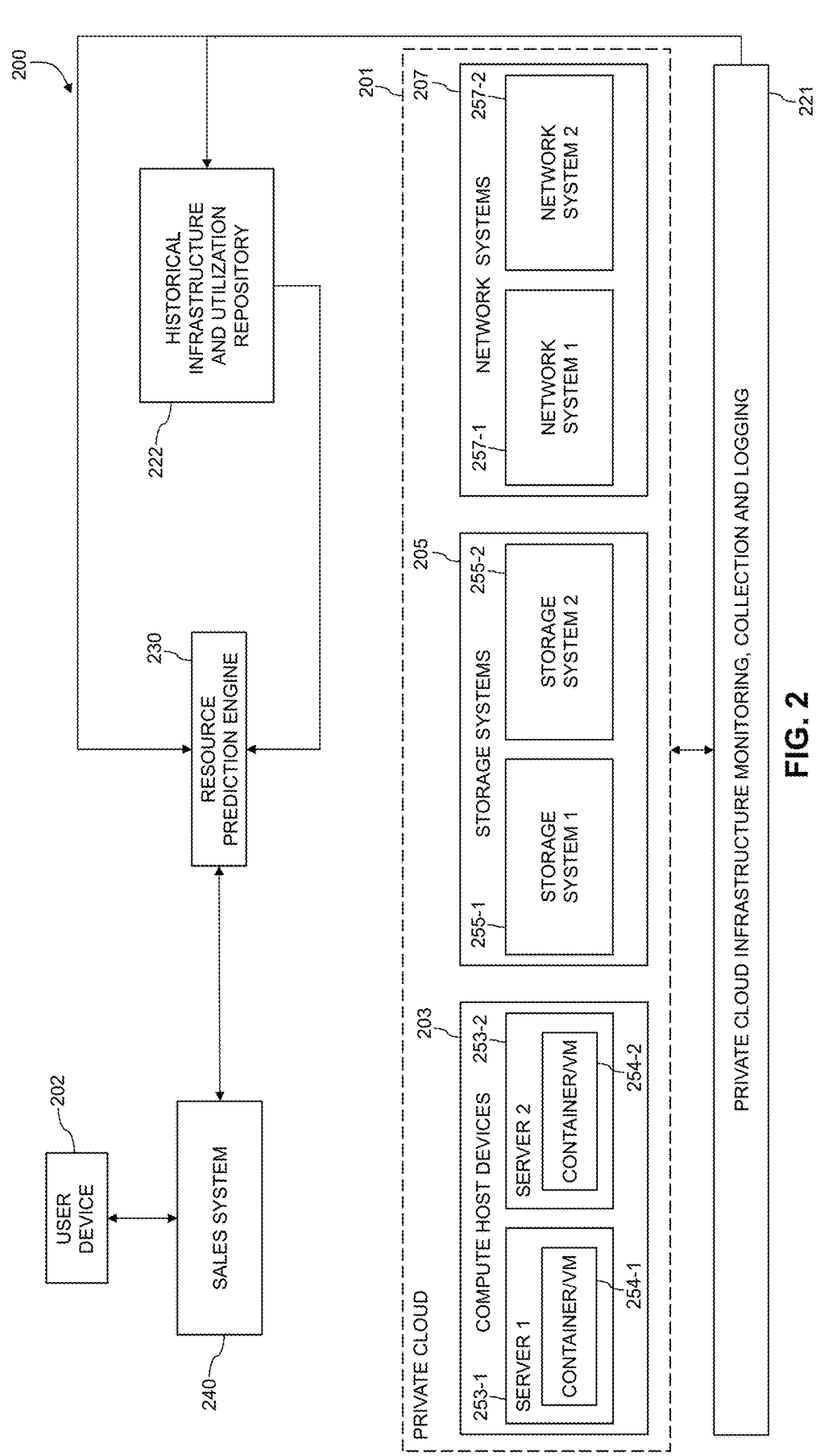
FIG. 2 depicts an operational flow for resource infrastructure prediction and provisioning in an illustrative embodiment.

Referring to the operational flow 200 in FIG. 2, the private cloud infrastructure monitoring, collection and logging layer 221, which is the same as or similar to the monitoring, collection and logging layer 121, monitors, collects and logs resource infrastructure and resource utilization data for various components of existing or previously deployed computing environments (e.g., existing or previously deployed private cloud environments). The collected resource infrastructure and resource utilization data is sent to the historical infrastructure and utilization repository 222 (which is the same as or similar to the historical infrastructure and utilization repository 122) and is provided to the resource prediction engine 230 as training data. The resource prediction engine 230 is the same as or similar to the resource prediction engine 130.

For example, the private cloud infrastructure monitoring, collection and logging layer 221 monitors, collects and logs resource infrastructure and resource utilization parameters for compute host devices 203, storage systems 205 and network systems 207 of private cloud 201. The compute host devices 203 can be the same as or similar to the compute host devices 103. The storage systems 205 can be the same as or similar to the storage systems 105. The network systems 207 can be the same as or similar to the network systems 107.

In a non-limiting example, the compute host devices 203 comprise first and second servers (server 1 253-1 and server 2 253-2). Each of the servers 1 and 2 253-1 and 253-2 includes one or more container/VM instances 254-1 and 254-2. The storage systems 205 comprise first and second storage systems (storage system 1 255-1 and storage system 2 255-2). The network systems 207 comprise first and second network systems (network system 1 257-1 and network system 2 257-2). Although two servers 253-1 and 253-2, two storage systems 255-1 and 255-2 and two network systems 257-1 and 257-2 are shown, the embodiments are not necessarily limited thereto. For example, there may be more or less than two servers 253-1 and 253-2, two storage systems 255-1 and 255-2 and two network systems 257-1 and 257-2.

The sales system 240 is the same as or similar to the sales system 140. In an illustrative embodiment, the sales system 240 receives an order for a new computing environment (e.g., new private cloud) from, for example, the user device 202. The user device 202 may be the same as or similar to the user devices 102. In response to a received order, the sales system 240 generates a request for the resource prediction engine 230 to predict a type and a quantity of respective ones of a plurality of resources for the new computing environment. The request comprises a plurality of factors which are inputted to and analyzed by the resource prediction engine 230 to make the predictions. As noted above, the plurality of factors comprise, for example, an identification of needed resources (e.g., servers, storage systems and/or network systems) from the order, a type of usage (e.g., production (deployment) and/or non-production (development)) for the needed resources identified in the order, an industry corresponding to the requesting entity and/or volume of IO operations associated with one or more time periods (e.g., seasonal volume).

In illustrative embodiments, the resource prediction engine 230 uses a multiple output classification and regression machine learning model to predict the type and the quantity of respective ones of the resources (e.g., servers, storage systems and/or network systems) in response to the request. The sales system 240 generates an order for the resources in accordance with the prediction, and transmits the order to, for example, the user device 202 to automatically provision the resources to the new computing environment.

Figure 3:
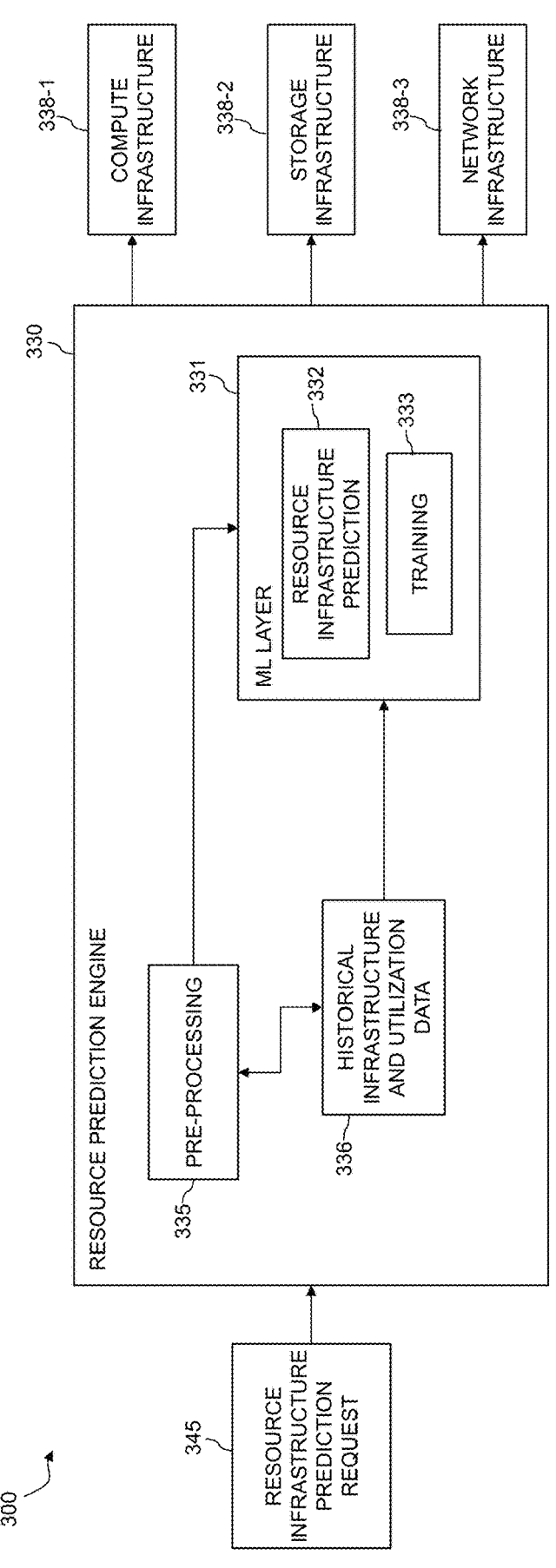
FIG. 3 depicts an operational flow for a resource prediction engine to predict resource infrastructures in an illustrative embodiment.

Referring to the operational flow 300 in FIG. 3, a more detailed explanation of an embodiment of a resource prediction engine 330 is described. The resource prediction engine 330 may be the same as or similar to the resource prediction engine 130 or 230. A resource infrastructure prediction request 345 is received from, for example, a sales system (e.g., sales system 140 or 240) and input to the resource prediction engine 330. The resource prediction engine 330 illustrates a pre-processing component 335, which processes the incoming request and the historical infrastructure and utilization data 336 for analysis by the machine learning (ML) layer 331. For example, the pre-processing component 335 removes any unwanted characters, punctuation, and stop words. As can be seen in FIG. 3, the resource prediction engine 330 predicts a type and a quantity of respective ones of a plurality of resources for a computing environment using the ML layer 331 comprising resource infrastructure prediction and training layers 332 and 333. The ML layer 331 is the same as or similar to machine learning layer 131. The resource infrastructure prediction layer 332 predicts, based on a plurality of factors which are inputted to and analyzed by the resource prediction engine 330, a compute infrastructure 338-1, a storage infrastructure 338-2 and a network infrastructure 338-3. According to one or more embodiments, the compute infrastructure 338-1 comprises one or more types of servers and a corresponding quantity of each of the one or more server types for the computing environment, the storage infrastructure 338-2 comprises one or more types of storage systems and a corresponding quantity of each of the one or more storage system types for the computing environment, and the network infrastructure 338-3 comprises one or more types of network systems and a corresponding quantity of each of the one or more network system types for the computing environment. As noted above, the plurality of factors considered by the resource infrastructure prediction layer 332 comprise, for example, an identification of needed resources from the resource infrastructure prediction request 345, a type of usage for the needed resources identified in the resource infrastructure prediction request 345, an industry corresponding to the requesting entity and/or one or more seasonal volumes of IO operations.

In connection with the operation of the resource prediction engine 330 (or 130/230), FIG. depicts example pseudocode 500 for importation of libraries used to implement the resource prediction engine 330. For example, Python, ScikitLearn, Pandas and Numpy libraries can be used. Some embodiments may implement multi-output classification and regression using a neural network with Tensorflow® and/or Keras libraries. The neural network includes a plurality of layers respectively corresponding to multiple outputs (e.g., the type and the quantity of respective ones of a plurality of resources). For example, in an illustrative embodiment, the neural network comprises 6 parallel branches including a classification branch (corresponding to resource type) for each of compute, storage and network resources, and a regression branch (corresponding to resource quantity) for each of the compute, storage and network resources.

FIG. 6 depicts example pseudocode 600 for loading historical infrastructure and utilization data into a Pandas data frame for building training data. Referring back to the pre-processing component 335 in FIG. 3, since machine learning works with numbers, categorical and textual attributes like customer name, usage type (e.g., production (deployment), non-production (development), etc. must be encoded before being used as training data. In one or more embodiments, this can be achieved by leveraging a LabelEncoder function of ScikitLearn library as shown in the pseudocode 701 in FIG. 7A. FIG. 7B depicts a table 702 of the encoded training data, where categorical and textual attributes are converted into numerical values.

According to illustrative embodiments, the encoded training dataset is split into training and testing datasets, and separate datasets are created for independent variables and dependent variables. For example, some embodiments use six dependent variables (e.g., compute resource (server) type and quantity, storage resource (storage system) type and quantity and network resource (network system) type and quantity). FIG. 8 depicts example pseudocode 800 for splitting a dataset into training and testing components and for creating separate datasets for independent (X) and dependent (y) variables.

Once the datasets are ready for training and testing, a composite, multi-output (multi-target) neural network model capable of predicting multiple target variables is built. The multiple target variables include, for example, type and quantity of each resource (e.g., compute, storage and network resources). For example, referring to FIG. 9, which depicts example pseudocode 900 for building a neural network, a dense neural network is built using a Keras functional model. Six separate dense layers are added to the input layer with each network being capable of predicting a target (e.g., compute resource (server) type and quantity, storage resource (storage system) type and quantity and network resource (network system) type and quantity).

Referring to FIG. 10, which depicts example pseudocode 1000 for compiling and training the generated neural network, an Adam optimization algorithm is used as an optimizer, a categorical cross-entropy function is used as a loss function for the classifiers and mean squared error is used as a loss function for regression paths to each target. The model is trained with independent variable data (X train) and the target variables are passed for each classification and regression path. FIG. 11 depicts example pseudocode 1100 for computing error of the neural network model. As can be seen in the pseudocode 1100, a loss value of the model is computed using a test dataset. For example, loss is a scalar value referring to the falseness of a prediction made by the machine learning model.

As shown by the pseudocode 1200 in FIG. 12, the neural network model predicts multiple target values (e.g., compute resource (server) type and quantity, storage resource (storage system) type and quantity and network resource (network system) type and quantity) by passing independent variable values.

According to one or more embodiments, the historical infrastructure and utilization repository 122/222 and other data repositories or databases referred to herein can be configured according to a relational database management system (RDBMS) (e.g., PostgreSQL). In some embodiments, the historical infrastructure and utilization repository 122/222 and other data repositories or databases referred to herein are implemented using one or more storage systems or devices associated with the resource prediction platform 110. In some embodiments, one or more of the storage systems utilized to implement the historical infrastructure and utilization repository 122/222 and other data repositories or databases referred to herein comprise a scale-out all-flash content addressable storage array or other type of storage array.

Although shown as elements of the resource prediction platform 110, the data collection engine 120, resource prediction engine 130 and/or sales system 140 in other embodiments can be implemented at least in part externally to the resource prediction platform 110, for example, as standalone servers, sets of servers or other types of systems coupled to the network 104. For example, the data collection engine 120, resource prediction engine 130 and/or sales system 140 may be provided as cloud services accessible by the resource prediction platform 110.

The data collection engine 120, resource prediction engine 130 and/or sales system 140 in the FIG. 1 embodiment are each assumed to be implemented using at least one processing device. Each such processing device generally comprises at least one processor and an associated memory, and implements one or more functional modules for controlling certain features of the data collection engine 120, resource prediction engine 130 and/or sales system 140.

At least portions of the resource prediction platform 110 and the elements thereof may be implemented at least in part in the form of software that is stored in memory and executed by a processor. The resource prediction platform 110 and the elements thereof comprise further hardware and software required for running the resource prediction platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, resource prediction engine 130, sales system 140 and other elements of the resource prediction platform 110 in the present embodiment are shown as part of the resource prediction platform 110, at least a portion of the data collection engine 120, resource prediction engine 130, sales system 140 and other elements of the resource prediction platform 110 in other embodiments may be implemented on one or more other processing platforms that are accessible to the resource prediction platform 110 over one or more networks. Such elements can each be implemented at least in part within another system element or at least in part utilizing one or more stand-alone elements coupled to the network 104.

It is assumed that the resource prediction platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, resource prediction engine 130, sales system 140 and other elements of the resource prediction platform 110, and the elements thereof can each be implemented in the form of one or more LXCs running on one or more VMs. Other arrangements of one or more processing devices of a processing platform can be used to implement the data collection engine 120, resource prediction engine 130 and sales system 140, as well as other elements of the resource prediction platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the resource prediction platform 110 to reside in different data centers. Numerous other distributed implementations of the resource prediction platform 110 are possible.

Accordingly, one or each of the data collection engine 120, resource prediction engine 130, sales system 140 and other elements of the resource prediction platform 110 can each be implemented in a distributed manner so as to comprise a plurality of distributed elements implemented on respective ones of a plurality of compute nodes of the resource prediction platform 110.

It is to be appreciated that these and other features of illustrative embodiments are presented by way of example only, and should not be construed as limiting in any way. Accordingly, different numbers, types and arrangements of system elements such as the data collection engine 120, resource prediction engine 130, sales system 140 and other elements of the resource prediction platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the resource prediction platform can be offered to cloud infrastructure customers or other users as part of FaaS, CaaS and/or PaaS offerings.

The operation of the information processing system 100 will now be described in further detail with reference to the flow diagram of FIG. 13. With reference to FIG. 13, a process 1300 for resource infrastructure prediction as shown includes steps 1302 and 1304, and is suitable for use in the system 100 but is more generally applicable to other types of information processing systems comprising a resource prediction platform configured for resource infrastructure prediction.

In step 1302, a request to predict a type and a quantity of respective ones of a plurality of resources for a computing environment is received. In step 1304, using a multiple output classification and regression machine learning model, the type and the quantity of the respective ones of the plurality of resources are predicted in response to the request. The machine learning model is trained with a dataset comprising historical resource data corresponding to respective ones of a plurality of users. The plurality of resources comprise a server, a storage system and/or a network system, and the type of the respective ones of the plurality of resources comprises a server type, a storage system type and/or a network system type. The quantity of the respective ones of the plurality of resources comprises a number of servers, a number of storage systems and/or a number of network systems. In illustrative embodiments, the computing environment comprises a private cloud environment.

One or more independent variable datasets and one or more dependent variable datasets are created from the dataset. The one or more dependent variable datasets correspond to at least one of the server type, the number of servers, the storage system type, the number of storage systems, the network system type the number of network systems.

The request comprises a plurality of factors inputted to and analyzed by the machine learning model in connection with the predicting. The plurality of factors comprise an identification of needed resources, a type of usage for the needed resources, an industry corresponding to an entity associated the request and/or a volume of input-output operations associated with one or more time periods.

The historical resource data comprises a virtual instance type, a virtual instance identifier, a compute quantity, a compute size, a memory size, a storage size, a time period, a server type, a server quantity, a storage system type, a storage system quantity, a network system type and/or a network system quantity. The historical resource data further comprises a central processing unit (CPU) utilization, a memory utilization, a storage utilization, a network input-output value and a block input-output value. The historical resource data is extracted from a logging system and/or a monitoring system.

In illustrative embodiments, outputs of the multiple output classification and regression machine learning model comprise the type and the quantity of the respective ones of the plurality of resources. The machine learning model comprises a neural network having a plurality of layers respectively corresponding to the type and the quantity of the respective ones of the plurality of resources.

According to one or more embodiments, an order for the respective ones of the plurality of resources is generated based at least in part on the prediction. The order is transmitted to one or more user devices to automatically provision the respective ones of the plurality of resources to the computing environment.

It is to be appreciated that the FIG. 13 process and other features and functionality described above can be adapted for use with other types of information systems configured to execute resource infrastructure prediction services in a resource prediction platform or other type of platform.

The particular processing operations and other system functionality described in conjunction with the flow diagram of FIG. 13 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 13 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a resource prediction platform as disclosed herein can provide a number of significant advantages relative to conventional arrangements. For example, the resource prediction platform uses machine learning to predict type and quantity of various resources for a computing environment. Technical problems exist with conventional approaches that use a static and heuristics-based techniques that are not able to factor in dynamic aspects of current and future customer needs when building an optimal infrastructure that has sufficient capability to meet demand, while not wasting idle resources.

Unlike conventional approaches, illustrative embodiments provide technical solutions which formulate programmatically and with a high degree of accuracy, the prediction of the type of servers, storage systems and network systems, as well as the quantity of each to build an optimal infrastructure based on customer need and environment. The embodiments advantageously leverage one or more sophisticated machine learning models and train the machine learning model(s) using historical infrastructure and utilization data corresponding to the same or similar customers as those for which new computing environments need to be created.

As an additional advantage, illustrative embodiments implement a multi-target classification and regression model that is trained using multi-dimensional features of historical resource configuration and utilization data. The model predicts the type and number of resources, wherein the prediction factors in, for example, identified customer needs, future growth, seasonal transaction volume, non-seasonal transaction volume, load, a type of usage for the needed resources and/or an industry corresponding to an entity associated a computing environment request.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the resource prediction platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a resource prediction platform in illustrative embodiments. These and other cloud-based systems in illustrative embodiments can include object stores.

Illustrative embodiments of processing platforms will now be described in greater detail with reference to FIGS. 14 and 15. Although described in the context of system 100, these platforms may also be used to implement at least portions of other information processing systems in other embodiments.

Figure 14:
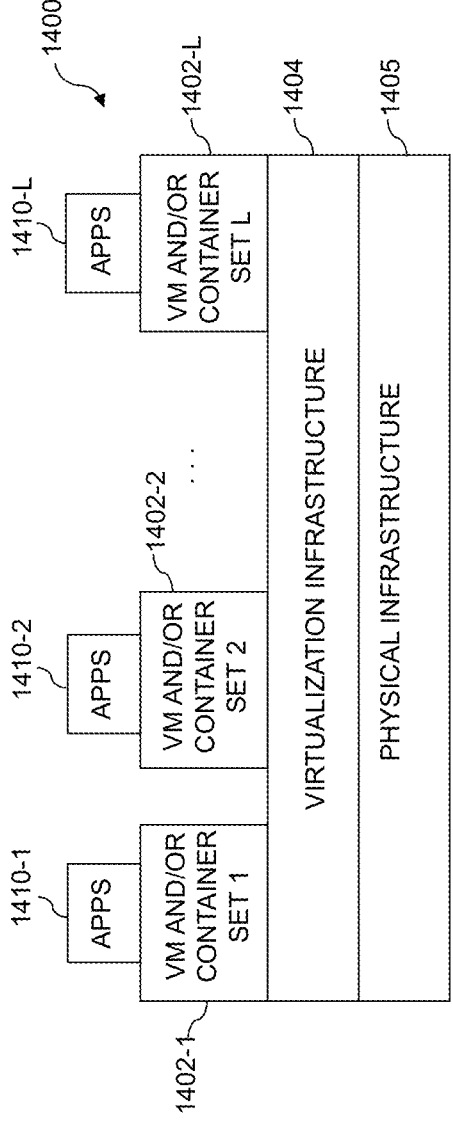
FIGS. 14 and 15 show examples of processing platforms that may be utilized to implement at least a portion of an information processing system according to illustrative embodiments.
Figure 15:
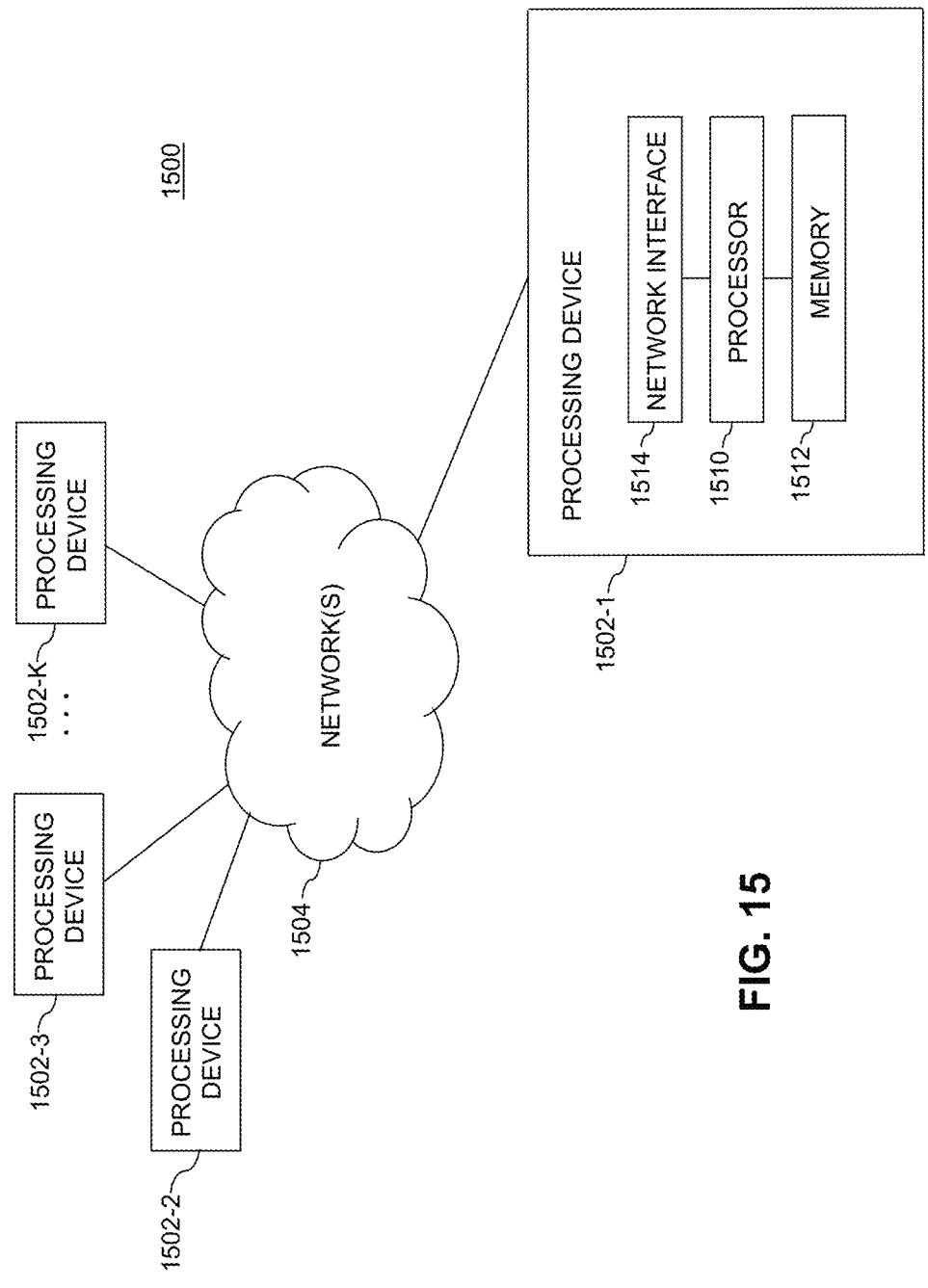

FIG. 14 shows an example processing platform comprising cloud infrastructure 1400. The cloud infrastructure 1400 comprises a combination of physical and virtual processing resources that may be utilized to implement at least a portion of the information processing system 100. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512. The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the resource prediction platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and resource prediction platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

training, by a processing platform, a machine learning model comprising a multiple output classification and regression machine learning model which is trained to predict types and quantities of different resources for implementing resource infrastructures of computing environments;

receiving, by the processing platform, a request to predict a type and a quantity of different resources for implementing a resource infrastructure for deploying a new computing environment for a given user based at least in part on user-specified resource requirements;

in response to the request, utilizing, by a resource prediction engine of the processing platform, the trained multiple output classification and regression machine learning model to predict the type and the quantity of the different resources for implementing a given resource infrastructure for deploying the new computing environment, based at least in part on the user-specified resource requirements of the given user; and automatically provisioning, by the processing platform, the given resource infrastructure based on the predicted type and quantity of the different resources to thereby deploy the new computing environment;

wherein the machine learning model is trained with a dataset comprising historical resource data corresponding to resource infrastructures and resource utilization of existing or currently deployed computing environments of other users.

2. The method of claim 1 wherein the different resources comprise server resources, storage system resources, and network system resources.

3. The method of claim 1 wherein:
the user-specified resource requirements comprise an identification of needed resources, and a type of usage for the needed resources; and
the trained multiple output classification and regression machine learning model utilizes other factors to predict the type and the quantity of the different resources for implementing the given resource infrastructure for deploying the new computing environment, the other factors comprising an industry corresponding to an entity associated the request and a volume of input-output operations associated with one or more time periods.

4. The method of claim 1 wherein the historical resource data comprises at least one of a virtual instance type, a virtual instance identifier, a compute quantity, a compute size, a memory size, a storage size, a time period, a server type, a server quantity, a storage system type, a storage system quantity, a network system type and a network system quantity.

5. The method of claim 1 wherein the historical resource data comprises at least one of a central processing unit (CPU) utilization, a memory utilization, a storage utilization, a network input-output value and a block input-output value.

6. The method of claim 1 wherein outputs of the multiple output classification and regression machine learning model comprise the type and the quantity of the different resources.

7. The method of claim 1 further comprising extracting the historical resource data from at least one of a logging system and a monitoring system.

8. The method of claim 1 wherein the new computing environment comprises a private cloud environment.

9. The method of claim 1 further comprising:
generating, by the processing platform, an order for resources corresponding to the predicted type and quantity of the different resources; and
transmitting the order to one or more user devices to automatically provision the given resource infrastructure for the new computing environment.

10. The method of claim 2 wherein the type of the different resources comprises a server type, a storage system type and a network system type.

11. The method of claim 2 wherein the quantity of the different resources comprises a number of servers, a number of storage systems and a number of network systems.

12. The method of claim 2 further comprising creating from the dataset one or more independent variable datasets and one or more dependent variable datasets.

13. The method of claim 12 wherein the one or more dependent variable datasets correspond to at least one of a server type, a number of servers, a storage system type, a number of storage systems, a network system type, and a number of network systems.

14. The method of claim 6 wherein the machine learning model comprises a neural network having a plurality of layers respectively corresponding to the type and the quantity of the different resources.

15. An apparatus comprising:
at least one processing device operatively coupled to a memory which stores program instructions that are executed by the at least one processing device to instantiate a processing platform which is operates to:
train a machine learning model comprising a multiple output classification and regression machine learning model which is trained to predict types and quantities of different resources for implementing resource infrastructures of computing environments;
receive a request to predict a type and a quantity of different resources for implementing a resource infrastructure for deploying a new computing environment for a given user based at least in part on user-specified resource requirements;
in response to the request, utilize the trained multiple output classification and regression machine learning model to predict the type and the quantity of the different resources for implementing a given resource infrastructure for deploying the new computing environment, based at least in part on the user-specified resource requirements of the given user; and
automatically provision the given resource infrastructure based on the predicted type and quantity of the different resources to thereby deploy the new computing environment;
wherein the machine learning model is trained with a dataset comprising historical resource data corresponding to respective ones of a plurality of users.

16. The apparatus of claim 15 wherein outputs of the multiple output classification and regression machine learning model comprise the type and the quantity of the different resources.

17. The apparatus of claim 16 wherein the machine learning model comprises a neural network having a plurality of layers respectively corresponding to the type and the quantity of the different resources.

18. An article of manufacture comprising a non-transitory processor-readable storage medium having stored therein program code of one or more software programs, wherein the program code when executed by at least one processing device causes the at least one processing device to perform the steps of:
training a machine learning model comprising a multiple output classification and regression machine learning model which is trained to predict types and quantities of different resources for implementing resource infrastructures of computing environments;
receiving a request to predict a type and a quantity of different resources for implementing a resource infrastructure for deploying a new computing environment for a given user based at least in part on user-specified resource requirements;
in response to the request, utilizing the trained multiple output classification and regression machine learning model to predict the type and the quantity of the different resources for implementing a given resource infrastructure for deploying the new computing environment, based at least in part on the user-specified resource requirements of the given user; and automatically provisioning the given resource infrastructure based on the predicted type and quantity of the different resources to thereby deploy the new computing environment;

wherein the machine learning model is trained with a dataset comprising historical resource data corresponding to resource infrastructures and resource utilization of existing or currently deployed computing environments of other users.

19. The article of manufacture of claim 18 wherein outputs of the multiple output classification and regression machine learning model comprise the type and the quantity of the different resources.

20. The article of manufacture of claim 19 wherein the machine learning model comprises a neural network having a plurality of layers respectively corresponding to the type and the quantity of the different resources.

* * * * *